United States Patent [19]

Cayless

[11] Patent Number: 4,459,155
[45] Date of Patent: Jul. 10, 1984

[54] METHOD OF PRODUCING CORROSION INHIBITORS

[75] Inventor: Richard A. Cayless, London, England

[73] Assignee: The British Petroleum Company Limited, London, England

[21] Appl. No.: 329,866

[22] Filed: Dec. 11, 1981

[30] Foreign Application Priority Data

Jan. 10, 1981 [GB] United Kingdom ................. 8100727

[51] Int. Cl.³ .................................................. C09D 5/08
[52] U.S. Cl. ............................... 106/14.21; 106/14.25; 106/14.39; 106/288 B
[58] Field of Search ............... 106/14.21, 14.25, 14.39, 106/288 B; 252/389.54

[56] References Cited

U.S. PATENT DOCUMENTS

| 3,232,887 | 2/1966 | Pessimisis | 252/437 |
| 3,874,883 | 4/1975 | Robitaille et al. | 106/14.21 |
| 3,905,916 | 9/1975 | Riley et al. | 252/455 R |
| 3,969,127 | 7/1976 | Robitaille et al. | 106/14.21 |
| 4,016,108 | 4/1977 | Robson | 252/455 R |

FOREIGN PATENT DOCUMENTS 2071070A 9/1981 United Kingdom .

Primary Examiner—Lorenzo B. Hayes
Attorney, Agent, or Firm—Morgan, Finnegan, Pine, Foley & Lee

[57] ABSTRACT

A method of producing a corrosion inhibitor formed of particles of an inorganic oxide having corrosion inhibiting anions chemically bound to the particles comprising contacting the inorganic oxide with an aqueous solution containing corrosion inhibiting anions at a temperature of from 50° to 95° C. and at a pH sufficiently low to initiate ion-exchange and maintaining the pH at this low level by the addition to the solution of further anions or a compound forming such anions in solution. Preferably the corrosion inhibiting anions are molybdate anions.

The particles may be incorporated into protective coatings in amounts up to 80% wt based on dry film weight giving coatings with up to 12% wt of anions.

7 Claims, No Drawings

METHOD OF PRODUCING CORROSION INHIBITORS

This invention relates to a method of producing corrosion inhibitors suitable for incorporation into protective coatings, e.g. paints and plastic or rubberised coatings.

It is well known that certain anions have corrosion inhibiting properties and that compounds containing such species can be included in protective coatings. The compounds are usually in the form of sparingly water-soluble salts. The coatings themselves have a limited permeability to water and it is believed that the mechanism of corrosion inhibition involves the gradual dissolving of the compounds in water releasing the anions as the active inhibitors. For such systems to be effective over a long period the solubility of the compound is particularly important. If the compound is too soluble, blistering of the coating may occur and the compound will be rapidly depleted; if it is insufficiently soluble the compound will be ineffective.

The present invention is concerned with a method of producing corrosion inhibitors which depend for their effectiveness on ion exchange rather than solubility.

The specification of published U.K. Patent Application No.: GB 2071070A describes and claims a corrosion inhibitor comprising particles of an inorganic oxide having corrosion inhibiting anions chemically bound to the particles. The anions specifically disclosed are phosphate, chromate and benzoate anions. Such anions can be readily applied and chemically bound to inorganic oxides containing surface hydroxyl groups by contacting the oxide with an acidic solution containing the anions, the uptake tending to increase as the pH of the solution decreases.

It is known that molybdate salts also have corrosion inhibiting properties but corrosion inhibiting particles of molybdate anions chemically bound to an inorganic oxide are difficult to produce by the simple exchange technique of published U.K. Patent Application No.: GB 2071070A because it is difficult to prepare solutions of molybdate anions of sufficient concentration and hence a suitably low pH.

A technique has now been found for overcoming this difficulty, which can be used to produce corrosion inhibiting particles containing molybdate anions and generally to facilitate uptake of anions onto inorganic oxide particles.

According to the present invention, therefore, a method of producing a corrosion inhibitor formed of particles of an inorganic oxide having corrosion inhibiting anions chemically bound to the particles comprises contacting the inorganic oxide with an aqueous solution containing corrosion inhibiting anions at a temperature of from 50° to 95° C. and at a pH sufficiently low to initiate ion-exchange and maintaining the pH at this low level by the addition, to the solution, of further anions or a compound forming such anions in solution.

The method is particularly suitable for producing corrosion inhibiting particles containing molybdate anions but, as indicated above, may be of general applicability. Thus it can be used to produce corrosion inhibiting particles containing nitrobenzoate or di- or tri-nitrobenzoate anions which are similar to molybdate anions in that solutions of a sufficiently low pH are difficult to prepare. It may also be used to produce corrosion inhibiting particles containing phosphate, chromate and benzoate anions as described in published U.K. Patent Application No.: 2071070A, the technique giving better control over the ion-exchange reaction.

The pH necessary to initiate ion-exchange may vary with the inorganic oxide but is preferably less than or equal to 2.5.

The rate of addition of anions or a compound giving rise to anions should be such to maintain the pH at the required level until ion-exchange is complete. This point is reached when there is no rise in pH on stopping the addition of the anions. The pH of the solution may be continuously monitored with any suitable pH meter. A number of continuous pH monitors are commercially available.

In general any solution containing suitable anions at a suitable pH may be used, e.g. solutions of the relevant acids, or salts which dissolve to give acidic solutions.

In the case of molybdate anions, the aqueous solution containing molybdate anions can be molybdic acid produced by the addition, with stirring, of molybdenum trioxide ($MoO_3$) to water. Molybdenum trioxide may also be the compound added to maintain the pH.

The preferred inorganic oxide is alumina. Other oxides which may be suitable include zirconia, iron oxides ($Fe_2O_3$ and $Fe_3O_4$), and tin oxide. Mixed metal oxides may also be suitable as may naturally occurring clays such as kaolinite. As is well known, particles of alumina and other oxides may be prepared which have a proportion of hydroxyl groups on their surface, e.g. the so-called activated aluminas of commerce used, inter alia, as packing for chromatographic columns.

The uptake of anions can be measured by standard analytical techniques, e.g. X-ray fluorescence for molybdate, phosphate or chromate anions and carbon analysis for nitro-benzoate and benzoate anions. The minimum uptake will depend on the proportion of replaceable hydroxyl groups and, clearly, oxides with a high proportion of such groups are preferred. Examples of suitable aluminas are the commercially available activated aluminas sold under the name "Camag" by BDH and defined as having a Brockman Activity I for chromatography, and F1 aluminas sold by the Aluminium Company of America.

Depending on the proportion of hydroxyl groups on the inorganic oxide it has been found that up to 15% wt of molybdate anions can be combined with the oxide (i.e. up to 0.94 millimoles/g). The preferred lower limit is 1% wt. Similar quantities of other anions may also be combined and the ranges quoted hereafter may thus apply equally to particles with anions other than molybdate anions.

The corrosion inhibiting particles may be included in protective coatings and the present invention includes protective coatings containing corrosion inhibiting particles as described above. The protective coating may be any of the known types of protective coatings based on film forming polymers or resins, e.g. paints, varnishes and lacquers. It may, in particular, be primer paints based on epoxy resins, vinyl resins, alkyd resins or chlorinated rubbers. It may also be plastic or rubberised coatings or epoxy powder coatings.

The corrosion inhibiting particles may act as a filler for the coating and may be included in relatively large amounts of up to 60% wt, based on the composition to be applied and up to 80% wt based on the dry film weight.

Having regard to the quantity of anions which can be combined with the oxide as discussed previously it will be seen that the coatings may contain up to 12% wt of corrosion inhibiting anions based on the dry film weight.

Preferably the quantity of corrosion inhibiting anions is at the upper end of the range, preferred amounts of particles being 20-80% wt based on the dry film weight giving from 3 to 12% wt of corrosion inhibiting anions.

When used in protective coatings the particles should be suitably small so as to remain in suspension in the composition before application and so as not to substantially affect the ease of application or the smoothness of the dry coating. Suitable particle sizes may be up to 20 micron diameter.

The corrosion inhibiting particles act to release the corrosion inhibiting anion into solution by ion-exchange with an anion which exists in the environment in which the particles are used. Thus the invention is particularly useful for protecting structures in or above the sea, the sea providing chloride anions for exchange with the corrosion inhibiting anions. The structures will normally be metal structures and the corrosion inhibiting particles will normally be in a protective coating. Unlike present paints which act by the solubilisation of corrosion inhibiting salts, it is the permeability to the exchanging anions rather than the permeability of water which controls the rate of release of the corrosion inhibiting anions. Thus the corrosion inhibiting anions will be preferentially released from the alumina in those areas where the desired barrier properties of the coating are weakest.

Particular structures which may be protected are the hulls and superstructures of ships, and rigs and platforms used for oil or gas exploration or production.

The invention may, however, have application for protecting structues on land where potentially corrosive anions may be present in the atmosphere, e.g. structures subject to atmospheres with relatively high concentrations of $SO_2$, $SO_3$ or $Cl^-$.

The invention is illustrated by the following example.

EXAMPLE 50 g of alumina in the form of 14-28 mesh granules were added to 400 ml of distilled water at room temperature. The alumina was Alcoa F1 grade alumina supplied by the Aluminium Company of America.

Molybdenum trioxide ($MoO_3$) in the form of powder was added to the alumina and water with stirring and the pH of the solution was monitored with a portable digital pH meter. The meter was Model 6080 with probe set A supplied by Channel Electronics (Sussex) Limited.

The amount of oxide added and the resultant pH were:

| Amount of $MoO_3$ | pH |
|---|---|
| 0[11] | 9.9 |
| 10 g | 4.8 |
| 20 g | 4.4 |
| 30 g | 4.3 |

The pH thus reached a limiting pH of about 4.3, which remained steady indicating that the pH was not low enough to initiate ion exchange.

The solution containing 30 g of $MoO_3$ was, therefore, heated in stages and the pH meaured as follows:

| Temperature °C. | pH |
|---|---|
| 30 | 4.1 |
| 40 | 3.9 |
| 50 | 3.5 |
| 70 | 2.1 |
| 80 | 1.6 |
| 90 | 1.3 |
| 95 | 1.1 |

At 95° C. and pH 1.1, the pH rose rapidly indicating that ion exchange was occurring. Further $MoO_3$ was added to restore and maintain the pH at 1.1 for 15 minutes, after which the pH no longer showed a tendency to rise, indicating that reaction was complete.

The ion exchanged alumina was separated by filtration, washed, ground to a particle size below 20 micron and dried.

Analysis by X-ray fluorescence showed that the alumina contained 7.9% wt of molybdenum, corresponding to a molybdate ion content of 13% wt.

The molybdate exchanged alumina was incorporated into a paint base to give a plant of the following formulation:

| | |
|---|---|
| Synolac 76W | 100 g |
| Soya lecithin | 0.125 g |
| 36% Lead Octoate | 0.83 g |
| 12% Cobalt Octoate | 0.25 g |
| Nuodex Exkin 2 | 0.375 g |
| Microdol Talc | 51.82 g |
| Molybdate exchanged alumina | 60.55 g |

Synolac 76W is a long-oil alkyd solution in white spirit sold by Cray Valley Products Limited. The lead and cobalt octoates are driers sold by Manchem Limited. Nuodex Exkins 2 is an anti-skinning agent sold by Durham Raw Materials Limited. Soya Lecithin is a pigment dispersant sold by BOCM Silcock. Microdol Extra is a micronised talc sold by A/S Norwegian Talc.

The corrosion inhibiting qualities of this paint were compared with a paint made using 60.55 g of untreated alumina (also ground to below 20 micron) in place of the molybdate-exchanged alumina.

The paints were applied to steel panels previously cleaned in an ultrasonic bath and the panels were placed in a British Standard humidity cabinet (10 days at 100% humidity cycling between 42° and 48° C.). The following results were obtained on a scale of 1 to 5 where 1 is very good and 5 is bad.

| | Corrosion | Blistering |
|---|---|---|
| Molybdate-exchanged alumina | 2 | 1 |
| Plain alumina | 4 | 3 |

The results show that the incorporation of the molybdate ions has greatly improved the anti-corrosive performance of the paint.

I claim:

1. A method for the production of a corrosion inhibitor comprising particles of an inorganic oxide having from 1 to 15% by weight of molybdate anions chemically bound to the particles by ion-exchange, the corrosion inhibitor being prepared by contacting the inorganic oxide with an aqueous solution containing molybdate anions wherein the solution consist of water and a compound selected from the group consisting of molybdenum trioxide and molybdic acid at a temperature of from 50° to 95° C. which temperature is sufficiently above 50° C. to give an initial pH of less than or equal to 2.5 which pH is sufficiently low to initiate ion-exchange, and thereafter maintaining the pH at this low level by the addition to the solution of further molybdate anions or a compound forming such anions in solution.

2. A method for the production of a corrosion inhibitor as claimed in claim 1 in which the inorganic oxide used in the preparation of the corrosion inhibitor is alumina.

3. A method for the production of a corrosion inhibitor as claimed in claim 1 in which the aqueous solution containing molybdate anions used in the preparation of the corrosion inhibitor is molybdic acid.

4. A method for the production of a corrosion inhibitor as claimed in claim 3 in which the pH is maintained at the low level during the preparation of the corrosion inhibitor by the addition of molybdendum trioxide to the aqueous solution of molybdate anions.

5. A method for the production of a corrosion inhibitor according to claim 1 wherein the temperature is in the range of 70° to 95° C.

6. A corrosion inhibitor composition produced in accordance with the method of claim 1.

7. A protective coating including a corrosion inhibitor produced in accordance with the method as claimed in claim 1 and containing from 3 to 12% by weight of molybdate anions based on the dry film weight.

* * * * *